United States Patent [19]

Stimson et al.

[11] Patent Number: 5,511,114

[45] Date of Patent: Apr. 23, 1996

[54] TELEPHONE PRE-PAID CALLING CARD SYSTEM AND METHOD

[75] Inventors: Charles J. Stimson; Brady S. Beshear, both of Garland, Tex.

[73] Assignee: Call Processing, Inc., Dallas, Tex.

[21] Appl. No.: 254,237

[22] Filed: Jun. 6, 1994

[51] Int. Cl.$^6$ .................. H04M 15/00; H04M 17/00; G06K 5/00; G07D 7/00
[52] U.S. Cl. .................. 379/114; 375/121; 375/144; 235/380; 340/825.34
[58] Field of Search .................. 379/114, 115, 379/112, 121, 124, 125, 126, 127, 130, 131, 143, 144, 155; 235/380, 381; 340/825.33, 825.34, 825.35

[56] References Cited

U.S. PATENT DOCUMENTS

| | | |
|---|---|---|
| 4,439,636 | 3/1984 | Newkirk et al. . |
| 4,587,379 | 5/1986 | Masuda . |
| 4,706,275 | 11/1987 | Kamil .................. 375/144 |
| 4,776,000 | 10/1988 | Parienti .................. 379/144 X |
| 4,877,947 | 10/1989 | Toru . |
| 4,879,794 | 11/1989 | Tasaski .................. 379/144 |
| 5,101,098 | 3/1992 | Yoshinobu . |
| 5,146,067 | 9/1992 | Sloan et al. .................. 235/381 |
| 5,155,342 | 10/1992 | Takayoshi . |
| 5,192,947 | 3/1993 | Neustein . |
| 5,225,666 | 7/1993 | Carmelo et al. . |
| 5,264,689 | 11/1993 | Erik et al. . |
| 5,266,782 | 11/1993 | Alanärä et al. . |
| 5,327,482 | 7/1994 | Yamamoto .................. 379/144 X |
| 5,359,182 | 10/1994 | Schilling .................. 379/154 X |
| 5,409,092 | 4/1995 | Itaha et al. .................. 235/381 X |

Primary Examiner—Stephen Chin
Assistant Examiner—Paul Loomis
Attorney, Agent, or Firm—David H. Judson

[57] ABSTRACT

A pre-paid calling card system enables customers to access a telephone network and obtain long distance telephone service. The system includes four main functional components: a plurality of calling cards, a host computer, a plurality of on-site activation terminals and a call processor. Each of the calling cards preferably includes a body portion and a read-only memory stripe having stored therein a security number. The card is typically formed of cardboard or plastic and may include the security number in cleartext under a suitable blackout. The main management and processing of the system is effected by the host computer, which is connectable to the telephone network. The host includes a database for storing security numbers associated with authorized calling cards. The data terminals are remote from the host computer and connectable thereto for transmitting data between the terminals and the host computer. The call processor is controlled by the host computer for interfacing one or more customers to the telephone network using the authorized calling cards.

7 Claims, 2 Drawing Sheets

CALL RECORD

1. SECURITY NUMBER
2. AUTHORIZING TERMINAL I.D.
3. ISSUE DATE AND TIME
4. LAST USE DATE AND TIME
5. RECHARGE TERMINAL I.D.
6. BALANCE
7. LAST RECHARGE AMOUNT
8. "CARD-IN-USE" FLAG
9. LAST RECHARGE DATE AND TIME

FIG. 4

TELEPHONE PRE-PAID CALLING CARD SYSTEM AND METHOD

TECHNICAL FIELD

The present invention relates generally to telephone services and more particularly to a pre-paid calling card system having a remote terminal to provide on-site activation and recharging of calling cards in customer-defined amounts.

BACKGROUND OF THE INVENTION

Pre-paid calling card services are well-known in the art. Such cards are typically purchased from vending machines and the like and come in fixed value increments, for example, $10, $20 and $50. A $10 card provides the customer with a certain number (e.g., 30) minutes of long distance time from any touch-tone telephone to any location in the United States, regardless of the time of the call; the $20 card provides twice that amount, and so forth. Because the long distance charges are limited to the card's face value, neither the customer nor anyone who obtains possession of the card can run up a large bill.

In operation of the prior art system, cards are batch-activated by the card provider in a limited number of predetermined values. A customer purchases one of these pre-activated cards by paying a fee. The card typically includes a predetermined identification code (which may be obscured by a scratch off material). To use the card, the customer accesses the service (usually through an 800-number), enters the identification code (typically obtained from the back of the card), dials the destination number and the call begins. Prior to dialing, the system may inform the user of a then-current card balance. If during a call the time remaining on the card is about to expire, the customer may be prompted (through a voice over) that only a certain amount of time (e.g., 30 seconds) remains. When the designated time has expired, the call is automatically terminated.

Such systems have proved commercially successful and desirable for several reasons. Pre-paid calling card customers avoid collect and operator assistance surcharges, and they can obtain long distance calling without credit and without payment of monthly bills. The cards themselves are easy to use. While the prior art systems have proven advantageous, they have somewhat limited flexibility. The most significant drawback is the requirement that pre-paid calling cards be issued in fixed or preset amounts. Also, once the time allotted to a particular calling card expires, the card is typically discarded, requiring the customer to carry multiple cards that can be stolen or lost. Existing systems do not have the flexibility to allow the customers to purchase variable amounts of calling time or to recharge "used" cards at the retail site.

There is thus a need for improved telephone pre-paid calling card systems that overcome these and other problems associated with the prior art.

BRIEF SUMMARY OF THE INVENTION

It is an object of the present invention to provide a telephone pre-paid calling card system that includes on-site activation of calling cards in varying amounts.

It is still another object of the invention to provide a telephone pre-paid calling card system and method that facilitates point-of-sale activation of calling cards using data terminals connectable to a host computer.

It is yet another object of the present invention to provide a telephone calling card system wherein on-site recharging is provided to enable a pre-paid calling card to be reactivated and re-used following expiration of all or part of an initial authorization amount.

It is a further object of the invention to provide a telephone pre-paid calling card system having a plurality of data terminals remotely connectable to a host computer connected to a telephone network, each of the data terminals providing on-site point-of-sale activation and recharging of calling cards in varying amounts. The host computer dynamically manages each of the authorized calling cards and interfaces each call to the network.

It is still another object of the invention to provide a pre-paid calling card system wherein each authorized calling card has a security number associated therewith for enabling a host computer to track usage, rechargings, recharge locations and similar management information. Preferably calling cards are authorized or re-authorized for variable amounts of calling time, although "stale" cards, i.e., cards that have been sold but not used or reauthorized for a predetermined time period (e.g., 6 months) may be purged from the system.

It is still a further object of the invention to provide a pre-paid calling card system wherein the host computer maintains a database of authorized cards, the database including detailed information about the authorization, recharge and use status of each card in the system.

In a preferred embodiment, a pre-paid calling card system enables customers to access a telephone network and obtain long distance telephone service. The system includes four main functional components: a plurality of calling cards, a host computer, a plurality of activation terminals and a call processor. Each of the calling cards preferably includes a body portion and a read-only memory stripe having stored therein a security number. The card is typically formed of cardboard or plastic and may include the security number in cleartext under a suitable blackout. The main management and processing of the system is effected by the host computer, which is connectable to the telephone network. The host includes a database for storing security numbers associated with authorized calling cards. The data terminals are remote from the host computer and connectable thereto for transmitting data between the terminals and the host computer. The call processor is controlled by the host computer for interfacing one or more customers to the telephone network using the authorized calling cards.

Preferably, each data terminal includes means (such as a cardreader) for reading a calling card to determine the security number stored in the read-only memory thereof, means (such as a keypad) for entering any monetary amount corresponding to an amount of call authorization associated with a particular calling card, means (such as a modem) for dialing the host computer to transfer the security number, the call authorization amount and the data terminal identification, and means (such as a display) for receiving and displaying a verification message from the host computer authorizing receipt of the monetary amount.

The data terminal allows for variable authorization and recharging of a calling card. When the cardreader cannot detect the security number stored in the memory (which may occur, for example, when the card has been damaged and it is presented for recharging), the data terminal operator may enter the security number using the keypad to enable point-of-sale activation or recharging of the card. By keeping track of the security number and the identification of the authorizing data terminal, the system can generate accounting and/or billing information so that system operator can determine which data terminal operator authorized and/or recharged a particular calling card. This enables the system operator to reconcile all transactions.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 4 is a call record of the pre-paid calling card system.

Similar reference characters refer to similar parts throughout the several views of the drawings.

DETAILED DESCRIPTION

Figure 1:
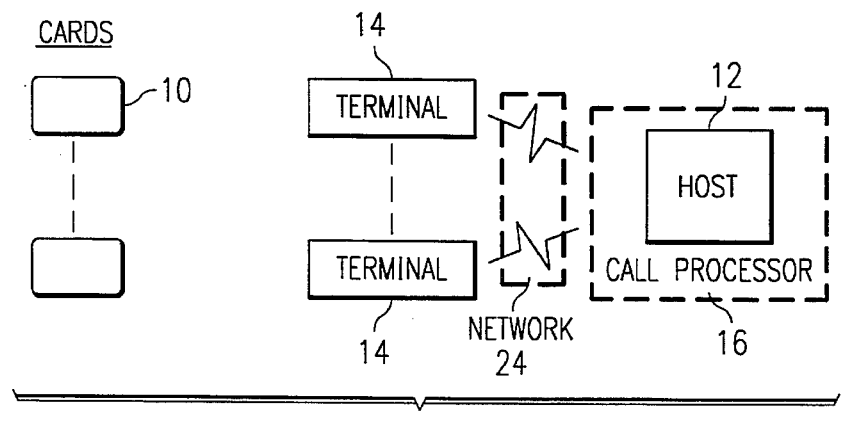
FIG. 1 is a block diagram of the telephone pre-paid calling card system of the present invention.
Figure 2:
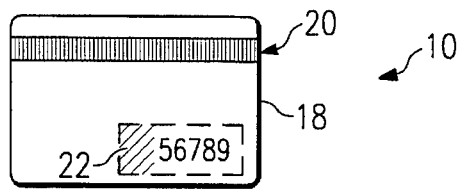
FIG. 2 is a representative pre-paid calling card.

Referring now to the drawings, there is illustrated an exemplary pre-paid calling card system that enables customers to access a telephone network and obtain long distance telephone service. As seen in FIG. 1, the system includes four main functional components: a plurality of calling cards 10, a host computer 12, a plurality of on-site activation terminals 14 and a call processor 16. As seen in FIG. 2, each of the calling cards preferably includes a body portion 18 and a read-only memory stripe 20 having stored therein a security number. The card is typically formed of cardboard or plastic and may include the security number in cleartext under a suitable user-removable scratch-off or other material 22 (such as an opaque tape). If desired, a smart card may be used to store the security number or other information, although preferably the system and method are implemented with so-called "dumb" or non-intelligent cards.

The main management and processing of the system is effected by the host computer 12, which is connectable to the telephone network 24. Although not meant to be limiting, preferably the host computer is a general purpose x86-type personal computer running a multi-tasking operating system such as UNIX. Alternatively, the host computer is implemented with any WINDOWS-based operating system. The host computer has sufficient storage associated therewith to enable a call record to be maintained for every authorized calling card in the system. The call record format will be described below.

Figure 3:
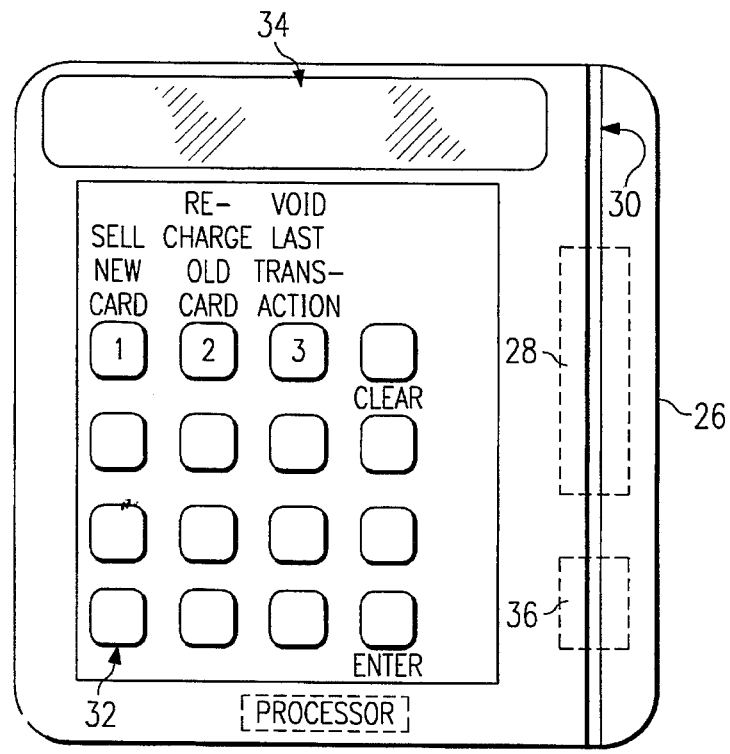
FIG. 3 is a plan view of one of the data terminals of FIG. 1 showing the keypad, display and card swipe components of the unit.

Each of the plurality of on-site activation terminals 14 is preferably a Model XL300 from Verifone, although other models may be used. As seen in FIG. 3, the activation terminal includes a housing 26 in which a number of functional components are included. A cardreader 28 includes a card-swipe slot 30 for receiving the calling card so that the memory stripe can be read. The unit also preferably includes a keypad 32 with various alphanumeric and control keys, and a display 34. The unit also includes a modem 36 (shown in phantom) for connecting the device over a telephone line to the host computer. The activation terminal also includes appropriate control circuitry for controlling the operation of the device.

Each of the terminals 14 is preferably located at a point-of-sale location where the calling cards are sold to users. The calling cards themselves may be stored under the terminal 14 in any convenient fashion. Generally, the data terminals are remote from the host computer and connectable thereto for transmitting data between the terminals and the host computer.

As can be seen, each data terminal 14 includes means (such as a cardreader) for reading a calling card to determine the security number stored in the read-only memory thereof, means (such as a keypad) for entering any monetary amount corresponding to an amount of call authorization associated with a particular calling card, means (such as a modem) for connecting to the host computer to transfer the security number, the call authorization amount and the data terminal identification, and means (such as a display) for receiving and displaying a verification message from the host computer authorizing receipt of the monetary amount. These particular input/output devices of the data terminal are merely exemplary, as other equivalent devices may also be used. For example, the cardreader may be replaced or supplemented with an optical scanner (to read a bar code or the like). When the cardreader cannot detect the security number stored in the memory (which may occur, for example, when the card is presented for recharging), the data terminal operator may enter the security number using the keypad to enable point-of-sale activation or recharging of the card. Likewise, the keypad may be replaced or supplemented with a voice recognition card connected to a microphone for providing limited speaker-independent or speaker-dependent discrete or continuous voice recognition. The communications link need not be made over a telephone line, but may be wireless. The display itself may be aural as opposed to visual.

The data terminals allow for point-of-sale variable authorization and recharging of calling cards. By keeping track of the security number and the identification of the authorizing data terminal, the system can generate accounting and/or billing information so that system operator can determine which data terminal operator authorized and/or recharged a particular calling card. This enables the system operator to reconcile all transactions.

The call processor of FIG. 1 is controlled by the host computer for interfacing one or more customers to the telephone network using the authorized calling cards. In the preferred embodiment, the call processor includes dedicated hardware and software for interfacing each of the data terminals to the host computer and to the telephone network. The call processor includes a T1 interface card (made by Mitel) which provides an external interface for two digital T1 circuits. In the system, one T1 circuit interfaces to the data terminals, and the other T1 circuit interfaces to the telephone network. Each T1 card has a bandwidth of 24 multiplexed 64 K-bit/second channels. The call processor also includes a number of call processing boards to playback voice files, record voice for other applications such as voice mail, recognize DTMF signalling, outdial DTMF on the outbound portions of each call, and monitor call progress.

Preferably each board is a Natural Microsystems Model VBX 1200 (and/or AG24), which includes a digital signal processor, and each such board handles up to 12 ports. In operation, each call in the system is assigned a port.

Preferably, each call record established in the system includes a number of pieces of information as shown in FIG. 4: the calling card security number, the identity of the store at which the card was issued (i.e., the identification of the authorizing terminal), the card's issue date and time, the card's last use date and time, the card's last recharge store number (i.e., the identify of the data terminal at which the card was last recharged), the card balance ($xxx.xx), the card's last recharge amount, a "card-in-use" flag and the card's last recharge date and time. By keeping track of the data terminals at which a card is initially authorized and later recharged, the system operator can reconcile multiple data from different store locations. This enables the system operator to credit or charge store operators for recharging provided by other store operators in the system.

The operation of the system can now be described. In a preferred call scenario, the possessor of an activated calling card first accesses the service through a dedicated telephone number (such as an 800 number) to which the host computer/call processor are connected. Upon call connection, the user is prompted to enter "security code" from back of card. The host computer checks the database and gives the appropriate response such as "your balance is _ minutes." Alternatively, the computer may issue a message that "this card was purchased or last recharged more than 6 months ago, please buy more TeleBuck$™ and call again" or "this security code is invalid" as the case may be. If there is a balance, the computer prompts the user to enter the area code and number that the user desires to call. The call is connected and if an answer is detected, the computer keeps track of the minutes used as the call proceeds. If the balance reaches 2 minutes, the caller is warned with a "2 minutes left" message and likewise at 30 seconds. When the balance is exhausted, the computer cuts off in the conversation and plays a message such as "time is up, buy more TeleBuck$ at any retail location or call us at 1 800 xxx-xxxx for recharge options".

The following is a typical card activation or recharging scenario. Assume a customer comes up to the counter and requests $12 worth of calling time. The clerk then obtains the next calling card from the plurality of cards, and begins the activation process. This is achieved by pressing the "Sell New Card" key (1). The new card is then swiped through the card reader slot. The amount of the transaction is then entered on the keypad. At this point the terminal dials out via the modem and waits for an answer. After communicating with the host, transmitting the request, the card and terminal identifiers, and receiving a verification, the unit displays a suitable response message. The operator is then prompted to collect the funds and this message (e.g., by a message, "Done Collect $xxx.xx") tells the operator that the security number on this card has been activated for the amount shown. The transaction is completed by giving the card to the customer. If the customer desires to pay using a credit card which itself needs to be verified, the data terminal may also be used for this purpose.

It should be appreciated that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A pre-paid calling card system to enable customers to purchase calling cards at predetermined locations and to use such calling cards to access a telephone network having at least one telephone, comprising:

a plurality of calling cards, each of said calling cards having a security number associated therewith that must be entered at a telephone to obtain access to the telephone network;

a host computer including at least one input port and a database for storing security numbers;

at least one data terminal located at a predetermined location remote from the host computer and connectable to the input port for associating, at the host computer, an amount of call authorization to a security number of a ceiling card using data transmitted between the data terminal and the host computer during one or more charging transactions, the means for associating of the data terminal including:

means for entering the security number;

means, operative during any initial transaction and any recharge transaction, for entering any monetary amount corresponding to the amount of call authorization;

means for connecting to the host computer to transfer the security number and the call authorization amount; and means responsive to the transfer for receiving a verification message from the host computer authorizing receipt of the monetary amount to thereby associate at the host computer the call authorization amount to the security number, wherein the calling card does not store the call authorization amount; and wherein the database includes a record for each calling card security number having a call authorization amount associated therewith, the record including a balance; and a call processor running on the host computer and responsive to entry of the security number for enabling the customer to access the telephone network using the telephone, the call processor using the balance in the record associated with the security number for monitoring call progress and terminating the customer's access to the telephone network when the balance is exhausted.

2. The pre-paid calling card system as described in claim 1 wherein the means for entering the security number of the data terminal is a cardreader.

3. The pre-paid calling card system as described in claim 1 wherein the means for entering any monetary amount of the data terminal is a keypad.

4. The pre-paid calling card system as described in claim 1 wherein the connecting means of the data terminal is a modem.

5. The pre-paid calling card system as described in claim 1 wherein the means for receiving of the data terminal is a display.

6. A pre-paid calling card system to enable customers to purchase calling cards at retail establishments and to use such calling card to access a telephone network having at least one telephone, comprising:

a plurality of calling cards, each of said calling cards having a security number associated therewith that must be entered by a customer at the telephone to obtain access to the telephone network;

a host computer connectable to the telephone network and including at least on input port and a database for storing security numbers;

a plurality of data terminals located at the retail establishments remote from the host computer and each connectable to the input port for associating, at the host computer, an amount of call authorization to a security number of a calling card using data transmitted between the data terminal and the host computer during one or more charging transactions, the means for associating of each data terminal including:

means for reading a calling card to determine the security number;

means, operative during any initial transaction and any recharge transaction, for entering a monetary amount corresponding to the amount of call authorization;

means for transferring to the host computer the security number and the call authorization amount; and means responsive to the transfer for receiving a verification message from the host computer authorizing receipt by the retail establishment of the monetary amount to thereby associate at the host computer the call authorization amount to the security number, wherein the calling card does not store the call authorization amount;

wherein the database includes a record for each calling card security number, the record including the initial call authorization amount and any recharge call authorization amount, a balance, and data terminal identification codes identifying the data terminals of the plurality of data terminals at which the initial and any recharge call authorization amounts were issued:

a call processor running on the host computer end responsive to entry of the security number by a customer for enabling the customer to access the telephone network using the telephone, the cell processor using the balance in the record associated with the security number for monitoring call progress and terminating the customer's access to the telephone network when the balance is exhausted.

7. A calling card system, comprising:

a host computer having a database;

a plurality of data terminals connectable to the host computer, each data terminal identified by a data terminal identification code and including means for authorizing calling card security numbers in selectable call authorization amounts; and a record stored in the database for each calling card security number authorized by a data terminal, at least one record including an initial call authorization amount and any recharge call authorization amount, and the data terminal identification codes identifying the data terminals at which the initial and any recharge call authorization amounts were issued such that call authorization amounts for the calling card which are generated by multiple data terminals can be reconciled.

* * * * *